TELEPHONE ALARM AND REPORTING APPARATUS

Filed Dec. 30, 1963

United States Patent Office 3,352,972

Patented Nov. 14, 1967

3,352,972

TELEPHONE ALARM AND REPORTING APPARATUS

David D. Brown and Leslie B. Manker, Portland, Oreg., assignor, by mesne assignments, to Tel-A-Matic, Inc., a corporation of Oregon Filed Dec. 30, 1963, Ser. No. 334,223
8 Claims. (Cl. 179—5)

ABSTRACT OF THE DISCLOSURE

An apparatus designed as an independent attachment associated with a card dialing telephone, including remote circuit completing members which are energized by a preselected condition, such as unauthorized entry into protected premises, detection of a fire etc. The apparatus includes devices which automatically actuate the conventional telephone apparatus in a preselected operational cycle and which transmit a recorded message to a preselected telephone receiver dialed automatically upon such actuation.

Broadly considered, the invention relates and is directed to improvements in apparatus for use in connection with a telephone for transmitting an alarm in the event of an unauthorized entry into, or in the event of a fire in a building. It particularly relates to apparatus having structural characteristics which permit its use with a card-dialer type of telephone.

The desire to protect lives and property from destruction by fire or thievery has produced numerous and varied emergency alarm and reporting systems and apparatus, including the use of telegraphic or telephonic communication systems. Even a cursory examination of the patent records reveals numerous and varied types of emergency alarm and reporting systems as an adjunct to telephonic communication. However, most of these types of burglar and fire alarm systems now in existence, employing telephone lines as a means for transmitting warning signals, are either directly connected to the telephone or are too complex, cumbersome, costly, inefficient and difficult to operate and maintain.

It is, therefore, the principal object of the invention to provide emergency alarm and reporting apparatus utilizing the usual telephone service for reporting an emergency to a selected central reporting station without interference with normal telephone operation to and from the protected building employing a special type of telephone instrument available to the public which is automatically actuated by any standard type of electrical alarm circuit at the locale of an emergency and which, in turn, actuates the telephone circuit and sequentially automatically dials preselected numbers and, through an electronic recording, audibly transmits a prearranged coded alarm signal from the location of the emergency to a central reporting station; and which automatically repeats the dialing and transmitting of the message after a lapse of a predetermined period of time to avoid failure of transmission of the message due to the telephone line being in use at the number dialed and until the apparatus is shut off after a lapse of a predetermined period of time.

More particularly, the apparatus embodying my invention is employed in conjunction with a card-dial type of telephone and with a tape recorder, each of which is actuated in a predetermined sequence in the event of an unauthorized entry or fire on the premises in which it is used, giving a predetermined coded alarm message to a preselected central reporting station which can immediately notify the appropriate agencies of the existence of an emergency at the locale from which the signal emanates.

Concomitant object to the foregoing principal object of the invention is to provide an alarm and reporting apparatus for use in conjunction with a special type of telephone commonly known as a "card dialer telephone" which does not in any wise interfere with the normal operation of the telephone or its electrical circuit, employ telephone company personnel for any purpose, or in any way affect the esthetic appearance of the telephone, or its surroundings, since the invention embodies simple structural features and its overall delineations are extremely unobtrusive.

Other objects of the invention are to provide an alarm and reporting apparatus for use with a special type of telephone which is simple in construction, easy to install, highly efficient in communicating the existence and location of an emergency, and inexpensive and economical to operate.

Other objects and advantages will undoubtedly reveal themselves from the following detailed description which is to be read in connection with the accompanying drawings which illustrate the preferred embodiment of the invention and in which.

Figure 1:
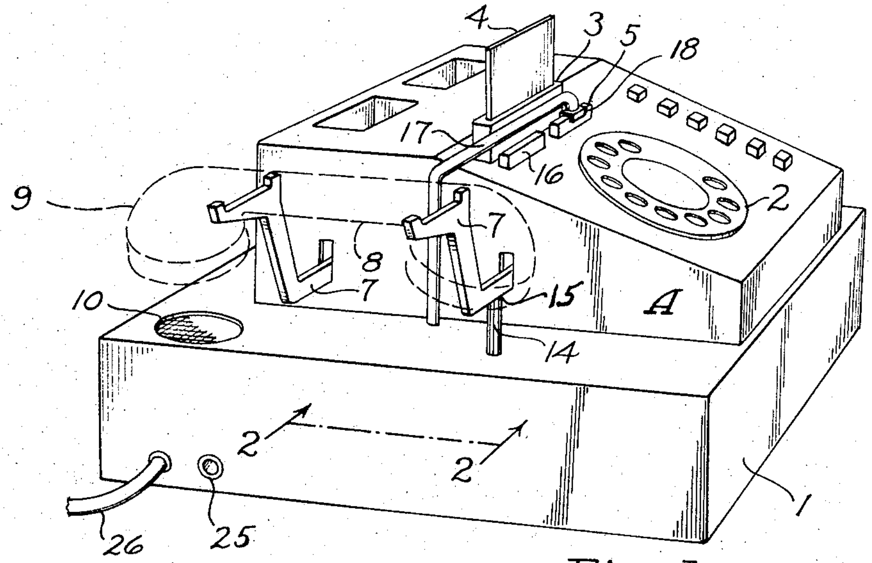
FIG. 1 is a perspective view of a card dialer telephone positioned upon the housing containing the actuating mechanism for the alarm and reporting system embodying the invention.
Figure 3:
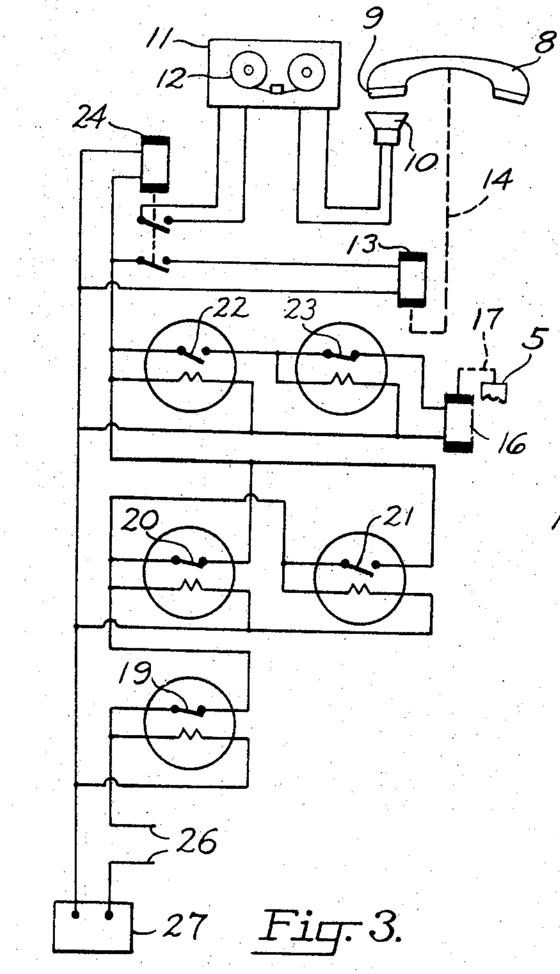
FIG. 3 is a detailed schematic diagram of the alarm and reporting system embodying the invention.

In FIG. 1, a housing 1, made of any suitable material and designed to complement the appearance of the telephone, designated generally by reference character A, contains the electrical circuit and devices shown schematically in FIG. 3. Telephone A is seated upon and is supported by housing 1 without the employment of any retaining or securing devices, thereby permitting the telephone to be readily removed from the top of housing 1.

Telephone A has the usual dial 2 but it is seldom used, since this type of telephone is normally dialed automatically by means of cards having telephone numbers coded thereon by means of punched holes. Telephone A is provided with a dial card slot 3 into which dialing card 4, having punched therein the telephone numbers desired to be called, is insertable. A start button 5 and a release button 6 are also provided in telephone A. Cradle 7 operates the telephone switch and holds the handset 8 at rest, when the phone is not in normal operation.

Whenever it is desired to place in operation the alarm and reporting apparatus installed on the premises having an appropriate emergency responsive electric circuit including strategically located detectors to activate it, the handset 8 of telephone A is arranged on the cradle 7 so that its transmitter 9 is directly over the speaker 10 and the dial card 4, containing the coded telephone numbers of the central reporting station, is pushed down as far as it will go into dial card slot 3.

Speaker 10, shown in FIG. 1 and diagrammatically in FIG. 3, receives its impulses from a message reproducer, such as a tape recorder 11, positioned in housing 1 and shown only diagrammatically in FIG. 3. Recorder 11 has a tape 12 thereon which contains a message usually in code to designate the location of this particular installation.

Figure 2:
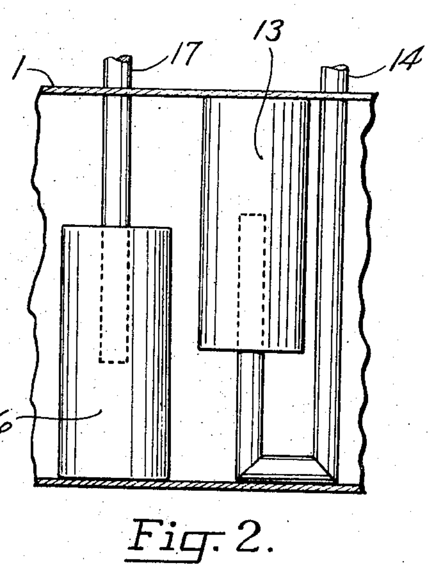
FIG. 2 is an enlarged, fragmentary, sectional view, taken on line 2—2 of FIG. 1, in the direction indicated by the arrows, showing a pair of solenoids and arms employed to manipulate the telephone into position for giving an alarm.

A solenoid 13, positioned under the housing 1, as shown in FIG. 2 and diagrammatically in FIG. 3, has a U-shaped arm 14 extending therefrom through housing 1 in direct alignment and in contact with portion 15 of cradle 7. Another solenoid 16 also positioned under housing 1, as shown in FIG. 2 and diagrammatically in FIG. 3, has an L-shaped arm 17 extending therefrom through housing 1 with its nipple 18 at its end overlying start button 5.

Relay switches 19, 20, 21, 22 and 23 and double pole relay switch 24, diagrammatically shown in FIG. 3, are confined within housing 1. All of these relay switches with the exception of the double pole relay switch 24 are time delay types and operate in the sequences hereinafter to be more fully explained. In order to operate the alarm and reporting apparatus embodying my invention, any type of emergency responsive electric circuit may be installed in and about the premises to protect likely points of entry or fire hazard. Connection of this emergency responsive circuit to the alarm and reporting apparatus embodying my invention may be made into the housing 1 at 25, and energy for the alarm and reporting apparatus comes from power source 26 and enters into the housing 1.

The emergency responsive electric circuit installed in the premises is connected to the alarm and recording apparatus at 27, as shown diagrammatically in FIG. 3. As previously stated, the emergency responsive circuit 27 can be either an open or closed circuit or the installation on the premises may include two separate emergency responsive circuits, one open and one closed. However, if both types of alarm circuits are used each of these circuits would have to be connected to the alarm and reporting apparatus at the same location, namely at 27. Regardless whether an open or closed emergency responsive electric circuit or both types of circuits are employed, it is essential that each of these circuits be complete and so arranged that if an open circuit is closed or a closed circuit is opened by tampering or fire or damaged in some other unauthorized manner, the alarm and reporting apparatus will immediately be triggered to go into operation and complete its dialing cycles in accordance with its predetermined time delay sequences.

For purposes of illustration only, I have assumed that a normally open emergency responsive circuit is installed in and about the premises using the alarm and reporting apparatus and is connected to the alarm and reporting apparatus at 27, shown diagrammatically in FIG. 3.

*Modus operandi*

In the event of an unauthorized entry or fire on the premises causing the activation of the emergency responsive circuit in the premises, double pole relay switch 24 closes. This immediately and simultaneously causes tape recorder 11 to start and solenoid 13 to be energized. U-shaped arm 14 is thereby forced up and raises cradle 7 of telephone A. The telephone line is thereby closed, making available the telephone for dialing. After a predetermined time lapse (8 seconds recommended), relay switch 22 closes and activates solenoid 16, causing arm 17 to be pulled down and nipple 18 to depress the start button 5 of the telephone A. Coded dialing card 4, normally held therein in inert position in card dial slot 3, is raised sufficiently in the slot to be immediately engaged for automatic "reading" of the coded telephone number by the telephone mechanism in order to initiate and complete the dialing cycle for reaching the first number coded on dialing card 4 and alert the central reporting station operator to hear the code name or number being continuously transmitted and repeated by recorder 11.

However, without interrupting this first dialing cycle and after a predetermined time lapse (3 seconds recommended), relay switch 23 opens, thereby cutting off power to solenoid 16 and forcing arm 17 to raise and nipple 18 to release start button 5. As soon as the dialing cycle for the first number has been completed, dial card 4 again positions itself in dial card slot 3 for automatic dialing of the second coded number.

On the expiration of a further predetermined period of time (90 seconds recommended), relay switch 20 simultaneously opens relay switches 22, 23 and 24 and breaks the circuit to solenoid 13, causing tape recorder 11 to stop and arm 14 to pull down to permit handset 7 to drop and open the telephone circuit.

The dial card 4 is coded to transmit two coded numbers in sequence so that after completing one cycle another sequence of operation is automatically initiated to transmit the second coded number on card dial 4. This is accomplished after a predetermined time lapse (150 seconds recommended) when relay switch 21 closes and simultaneously energizes relay switches 22, 23 and 24, and solenoids 13 and 16, and as a consequence thereof tape recorder 11 starts to operate again, U-shaped arm 14 raises cradle 7, and after a slight time delay (8 seconds recommended), arm 17 is pulled down and nipple 18 depresses start button 5, causing the coded dialing card 4 to be "read" by the telephone mechanism and thereby complete the second dialing cycle for reaching the second coded number on dialing card 4 and thereby alert the recipient of the second call to the code name or number being repeated by the tape on the recorder. Again without interrupting the second calling cycle and after a predetermined time lapse (3 seconds recommended) relay switch 23 opens and cuts off the power to solenoid 16, causing arm 17 to raise and nipple 18 to release its pressure on start button 5.

Upon the completion of both cycles of transmission of the emergency alarm to the two coded numbers on the dialing card 4, relay switch 19 opens and simultaneously, after a predetermined time delay (240 seconds recommended) closes relay switches 20 and 23 and opens relay switches 21, 22 and 24, stops tape recorder 11, and deenergizes solenoid 13 so that its arm 14 releases cradle 7 and thereby again opens the telephone circuit.

Because of this predetermined time delay inherent in relay switch 19, it remains open until the emergency responsive circuit in the premises is repaired at the points of damage to again make the emergency responsive circuit available for activating the alarm and reporting apparatus in the event of an unauthorized entry or fire on the premises.

From the foregoing, it is evident that the invention is susceptible to changes in details of construction and arrangements of parts, which, nevertheless, may come within the scope of our invention, and therefore, we do not wish to limit ourselves to the disclosure shown and described herein except as specified in the appended claims, in which we claim:

1. In an emergency alarm and reporting system for a building and the like, having an emergency condition responsive electric circuit including detectors strategically located therein, and a source of electric power, alarm and reporting apparatus adapted for actuation by said circuit and for use in combination with a card dialer type of telephone having a transmitter-receiver handset, a cradle type switch element on which the handset normally rests when the telephone is not in use, said cradle type switch element responsive to raising and lowering of the handset for controlling the service connection of the telephone with an automatic exchange station, and a dialing mechanism including a start button and a dial card containing a number series to automatically connect the telephone to the preselected receiving station responding to the number series dialed, comprising:

a housing on which said telephone is unrestrictedly seated;

means connected to the emergency detectors circuit and carried by said housing for raising the cradle type switch element to thereby close the telephone circuit;

a message reproducer in circuit with the emergency detectors for operation when the emergency detectors close the circuit to thereby reproduce a preselected message for transmission over the telephone; and means connected to the emergency detectors circuit and carried by said housing for depressing the telephone start button to thereby place the dial card into position for automatically dialing a preselected number series on said dial card to transmit said message to the receiving station responding to the number series dialed;

said means for raising the cradle type switch element, message reproducer, and means for depressing the start button, each arranged to function in time-controlled sequence in the order herein set forth after the initial actuation thereof when the emergency detectors circuit is closed.

2. In an emergency alarm and reporting system for a building and the like, having an emergency condition responsive electric circuit including detectors strategically located therein, and a source of electric power, alarm and reporting apparatus adapted for actuation by said circuit and for use in combination with a card dialer type of telephone having a transmitter-received handset, a cradle type switch element on which the handset normally rests when the telephone is not in use, said cradle type switch element responsive to raising and lowering of the handset for controlling the service connection of the telephone with an automatic exchange station, and a dialing mechanism including a start button and a dial card containing a number series to automatically connect the telephone to the preselected receiving station responding to the number series dialed, comprising:

a housing on which said telephone is unrestrictedly seated;

means connected to the emergency detectors circuit and carried by said housing for raising the cradle type switch element to thereby close the telephone circuit;

a message reproducer in circuit with the emergency detectors for operation when the emergency detectors close the circuit to thereby reproduce a preselected message for transmission over the telephone;

means in circuit with the emergency detectors carried by said housing for depressing the telephone start button to thereby place the dial card into position for automatically dialing a preselected number series punched on said dial card to transmit said message to the receiving station responding to the number series dialed; and a plurality of predetermined time lapse relay switches imposed on said housing and adapted for actuation when said emergency detectors circuit is closed to thereby actuate the cradle type switch raising means, message reproducing means, and start button depressing means in time-controlled sequence in the order herein set forth after the initial actuation thereof.

3. In an emergency alarm and reporting system for a building and the like, having an emergency responsive electric circuit including detetcors strategically located therein and a source of electric power, alarm and reporting apparatus adopted for actuation by said circuit and for use with a card dialer type of telephone having a transmitter-receiver handset, a cradle type switch element on which the handset normally rests when the telephone is not in use, said cradle type switch element responsive to raising and lowering of the handset for controlling the service connection of the telephone with an automatic exchange station, and a dialing mechanism including a start button and a dial card containing a number series to automatically connect the telephone to the preselected reporting station responding to the number series dialed, comprising:

a housing upon which said telephone is seated;

a solenoid operated arm extending from said housing and connected to the emergency detectors circuit for raising the cradle type switch element to thereby close the telephone circuit;

means positioned in said housing and indirectly in circuit with the emergency detectors for operation when the emergency detectors close the circuit to thereby reproduce a recorded message for transmission over the telephone;

another solenoid operated arm extending from said housing and indirectly in circuit with the emergency detectors for depressing the telephone start button to thereby place the dial card into position for automatically dialing a preselected number series on said dial card for transmitting said recorded message to the receiving station responding to the number series dialed; and signal responsive means which actuate said message reproducing means, and said arms in predetermined time delay sequences in the order herein set forth to thereby automatically transmit the recorded message by telephone when the emergency detectors circuit is closed.

4. In an emergency alarm and reporting system for a building and the like, having an emergency condition responsive electric circuit including detectors strategically located therein, and a source of electric power, alarm and reporting apparatus adapted for actuation by said circuit and for use in combination with a card dialer type of telephone having a transmitter-receiver handset, a cradle type switch element on which the handset normally rests when the telephone is not in use, said cradle type switch element responsive to raising and lowering of the handset for controlling the service connection of the telephone with an automatic exchange station, and a dialing mechanism including a start button and a dial card containing a number series to automatically connect the telephone to the preselected receiving station responding to the number series dialed, comprising:

a housing on which said telephone is seated;

a first solenoid with an extending arm within said housing adapted for raising the cradle type switch element to thereby close the telephone circuit;

a message reproducer in circuit with the emergency detectors for operation when the emergency detectors close the circuit to thereby reproduce a preselected message for transmission over the telephone;

a second solenoid with an extending arm within said housing for depressing the telephone start button to thereby place the dial card into position for automatically dialing a preselected number series contained on said dial card for transmitting said message to the receiving station responding to the number series dialed;

a double pole normally open relay switch controlled by the closing or opening of the emergency detectors circuit; and a plurality of single pole time delay relay switches in circuit with the double pole relay switch adapted for actuation when said emergency detector circuit is closed to thereby actuate said first solenoid, said message reproducer and said second solenoid in time-controlled sequence in the order herein set forth after the initial actuation thereof; and means provided in the relay switches circuit to permit the foregoing steps to be sequentially repeated without interruption.

5. An alarm and reporting apparatus in combination with a standard emergency responsive alarm circuit for use in conjunction with a dial card type of telephone to automatically alert a central reporting station, said telephone having a handset, a cradle therefor, a dial card and start button, and wherein said telephone is connected by a circuit to a telephone exchange comprising, in combination:

a housing containing the alarm and reporting apparatus adapted for supporting said telephone;

an arm extending from said housing and positioned beneath a portion of said cradle;

a solenoid positioned in said housing and secured to said arm for raising said cradle to thereby close said telephone circuit when said solenoid is energized;

a second arm extending from said housing and positioned above said start button;

a second solenoid positioned within said housing and secured to said second arm for depressing said start button to thereby cause said dial telephone to "read" said dial card;

a tape recorder positioned in said housing;

a speaker associated with said tape recorder and aligned with the transmitting position of said handset;

means for energizing said tape recorder; and means for energizing said solenoids whereby said cradle arm and said start button arm are sequentially raised and lowered to close and open the telephone circuit whereby a predetermined number is alerted by said telephone.

6. An alarm and reporting apparatus in combination with a standard emergency responsive alarm circuit for use in conjunction with a dial card type of telephone to automatically alert a central reporting station, said telephone having a handset, a cradle therefor, a dial card, and start button, and wherein said telephone is connected by a circuit to a telephone exchange comprising, in combination:

a housing containing the alarm and reporting apparatus adapted for supporting said telephone;

an arm extending from said housing and positioned beneath a portion of said cradle;

a solenoid positioned in said housing and secured to said arm for raising said cradle to thereby close said telephone circuit when said solenoid is energized;

a second arm extending from said housing and positioned above said start button;

a second solenoid positioned within said housing and secured to said second arm for depressing said start button to thereby cause said dial telephone to "read" said dial card;

a tape recorder positioned in said housing;

a speaker associated with said tape recorder and aligned with the transmitting portion of said handset;

means for energizing said tape recorder;

means for energizing said solenoids whereby said cradle arm and said start button arm are sequentially raised and lowered to close and open the telephone circuit whereby a predetermined number is alerted by said telephone; and means for sequentially energizing in a predetermined time-delayed pattern the said tape recorder and said solenoids upon closing the emergency conditioned alarm circuit.

7. Apparatus according to claim 6 wherein said means for sequentially energizing said tape recorder and said cradle arm solenoid and said start button solenoid comprises a double pole relay switch, and a plurality of relay switches providing continuity to the tape recorder and energy to the solenoids for predetermined periods of time and discontinuity after a lapse of predetermined periods of time.

8. Apparatus according to claim 6 wherein said means for sequentially energizing said tape recorder and said cradle arm solenoid and said start button solenoid comprises a double pole relay switch, and a plurality of relay switches providing continuity to the tape recorder and energy to the solenoids for predetermined periods of time and discontinuity after a lapse of predetermined periods of time, and after a predetermined time lapse sequentially again energize the tape recorder and the solenoids to provide continuity thereto for predetermined periods of time and discontinuity after a lapse of predetermined periods of time.

References Cited

UNITED STATES PATENTS

| | | | |
|---|---|---|---|
| 2,866,850 | 12/1958 | Duca et al. | 179—5 |
| 3,095,478 | 6/1963 | Adams | 179—5 |
| 3,131,260 | 4/1964 | Evans | 179—5 |

JOHN W. CALDWELL, *Acting Primary Examiner.*

J. T. STRATMAN, *Assistant Examiner.*